(12) United States Patent
Breedvelt-Schouten et al.

(10) Patent No.: US 9,398,259 B2
(45) Date of Patent: Jul. 19, 2016

(54) ENHANCING AWARENESS OF VIDEO CONFERENCE PARTICIPANT EXPERTISE

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/821,780

(22) Filed: Aug. 9, 2015

(65) Prior Publication Data

US 2016/0156876 A1  Jun. 2, 2016

Related U.S. Application Data

(63) Continuation of application No. 14/556,061, filed on Nov. 28, 2014.

(51) Int. Cl.
*H04N 7/14* (2006.01)
*H04M 3/42* (2006.01)
(Continued)

(52) U.S. Cl.
CPC . *H04N 7/15* (2013.01); *H04N 7/155* (2013.01)

(58) Field of Classification Search
CPC ... G01S 5/0072; G06F 17/3028; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04M 3/56; H04N 2007/145; H04N 5/272; H04N 7/14; H04N 7/141; H04N 7/142; H04N 7/144; H04N 7/147; H04N 7/148; H04N 7/15; H04N 7/152; H04N 7/155
USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16; 382/275; 379/265.03; 455/414.1, 566; 704/270
See application file for complete search history.

(56) References Cited

U.S. PATENT DOCUMENTS 6,795,106 B1  9/2004  Cooper
6,807,563 B1  10/2004  Christofferson et al.
(Continued)

OTHER PUBLICATIONS

"iVisit Presenter"; http://www.ivisit.com/products_presenter; [retrieved Mar. 24, 2014].
(Continued)

*Primary Examiner* — Khai N Nguyen
(74) *Attorney, Agent, or Firm* — North Shore Patents, P.C.; Michele Liu Baillie

(57) ABSTRACT

In enhancing awareness of video conference participant expertise, a live transcript of a video conference with a plurality of video conference participants is created. The live transcript is analyzed during the video conference using an ontology system. In analyzing the live transcript, one or more topics being discussed during the video conference are identified using the live transcript and the ontology system. The one or more topics are mapped to expertise of one or more video conference participants using participant expertise information. A video of each video conference participant mapped to the one or more topics is displayed with one or more visual indicators assigned to the one or more topics.

6 Claims, 5 Drawing Sheets

(51) Int. Cl.
*H04L 12/16* (2006.01)
*H04Q 11/00* (2006.01)
*H04N 7/15* (2006.01)

(56) References Cited

U.S. PATENT DOCUMENTS

| | | | |
|---|---|---|---|
| 6,850,252 B1* | 2/2005 | Hoffberg | G06K 9/00369 |
| | | | 348/E7.061 |
| 7,925,673 B2* | 4/2011 | Beard | G06Q 10/06 |
| | | | 707/758 |
| 8,275,102 B2* | 9/2012 | Zheng | H04M 1/575 |
| | | | 370/352 |
| 8,553,065 B2* | 10/2013 | Gannu | H04M 3/567 |
| | | | 348/14.07 |
| 8,667,169 B2* | 3/2014 | Patil | G06Q 30/02 |
| | | | 370/229 |
| 2007/0011012 A1 | 1/2007 | Yurick et al. | |
| 2008/0140421 A1 | 6/2008 | Marturano et al. | |
| 2010/0039564 A1* | 2/2010 | Cui | G06F 17/30796 |
| | | | 348/700 |
| 2012/0030729 A1* | 2/2012 | Schwartz | G06Q 10/0633 |
| | | | 726/1 |
| 2012/0131103 A1 | 5/2012 | Fox | |
| 2012/0143605 A1 | 6/2012 | Thorsen et al. | |
| 2012/0210247 A1 | 8/2012 | Khouri et al. | |
| 2012/0290950 A1 | 11/2012 | Rapaport et al. | |
| 2013/0110565 A1* | 5/2013 | Means, Jr. | G06Q 10/063 |
| | | | 705/7.11 |
| 2013/0124212 A1 | 5/2013 | Scoggins, II | |
| 2013/0124213 A1 | 5/2013 | Scoggins, II | |
| 2014/0104372 A1 | 4/2014 | Calman et al. | |
| 2014/0192141 A1 | 7/2014 | Begeja et al. | |
| 2014/0365213 A1* | 12/2014 | Totzke | G06F 17/2735 |
| | | | 704/235 |
| 2015/0003595 A1 | 1/2015 | Yaghi et al. | |

OTHER PUBLICATIONS

Tomadaki, Elia et al; "Videoconferencing in open learning"; OpenLearn, Researching open content in education, Proceedings of the OpenLearn2007 Conference; pp. 21-26; Oct. 30, 2007.

* cited by examiner

ENHANCING AWARENESS OF VIDEO CONFERENCE PARTICIPANT EXPERTISE

BACKGROUND

Multi-party video conferencing systems exist which displays to each participant the video of the other participants in the conference. During the video conference, participants interact through speech and visual cues available through the video displays. Some video conferencing systems provide additional mechanisms for interaction, such as a text chat, presentation or document sharing, desktop sharing, etc. However, these video conferencing systems do not provide the capability for participants to know which other participants may contribute to a topic being discussed. For example, one of the participant's background and experience may be unknown to the other participants, and thus the other participants would be unaware that this participant can contribute to the topic being discussed. Although participants can manually inform others of their background and experience, this approach is impractical when the number of participants is large.

SUMMARY

According to one embodiment of the present invention, in enhancing awareness of video conference participant expertise, a live transcript of a video conference with a plurality of video conference participants is created. The live transcript is analyzed during the video conference using an ontology system. In analyzing the live transcript, one or more topics being discussed during the video conference are identified using the live transcript and the ontology system. The one or more topics are mapped to expertise of one or more video conference participants using participant expertise information. A video of each video conference participant mapped to the one or more topics is displayed with one or more visual indicators assigned to the one or more topics.

System and computer program products corresponding to the above-summarized methods are also described and claimed herein.

DETAILED DESCRIPTION

Figure 1:
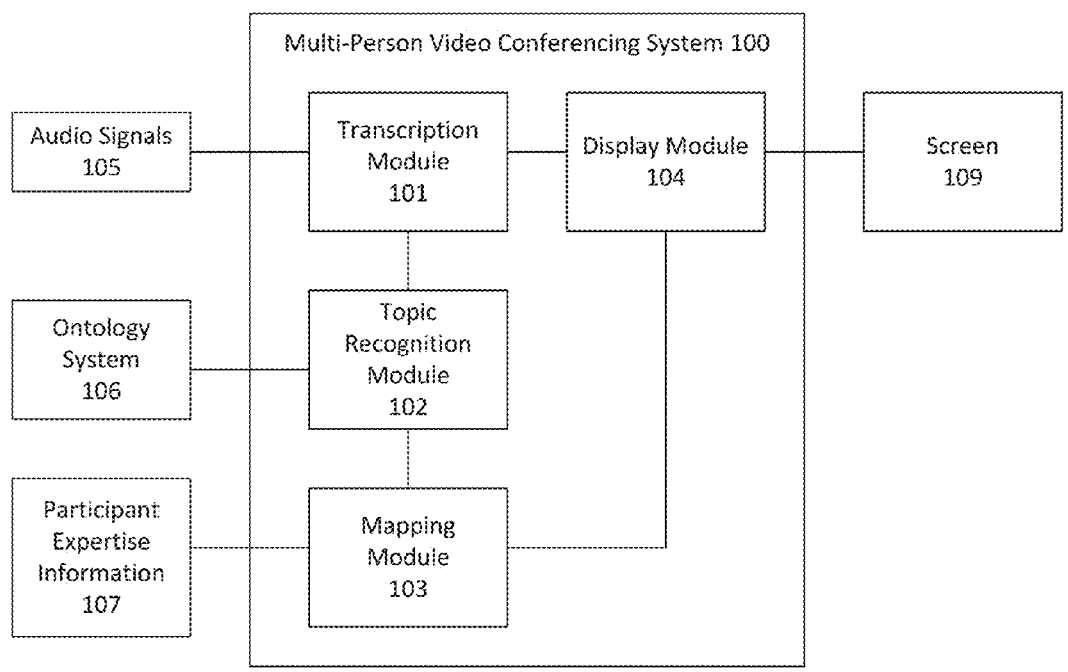
FIG. 1 illustrates a multi-person video conferencing system according to embodiments of the present invention.

FIG. 1 illustrates a multi-person video conferencing system according to embodiments of the present invention. The multi-person video conference system 100 includes a transcription module 101 which receives audio signals 105 of the conversation occurring among the video conference participants, a topic recognition module 102 with access to an ontology system 106, a mapping module 103 with access to expertise information 107 of the video conference participants, and a display module 104 for controlling the display of the video conference onto a screen 109.

Figure 2:
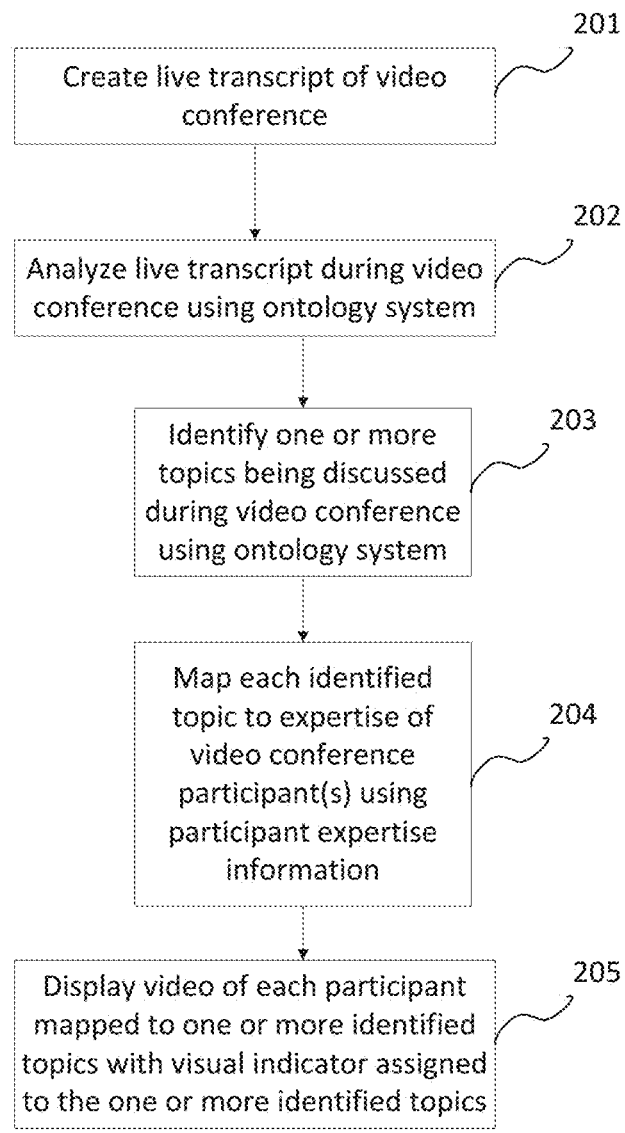
FIG. 2 is a flowchart illustrating a method for enhancing awareness of video conference participant expertise according to embodiments of the present invention.

FIG. 2 is a flowchart illustrating a method for enhancing awareness of video conference participant expertise according to embodiments of the present invention. Referring to FIGS. 1 and 2, the transcription module 101 receives the audio signals 105 of the conversation occurring among the video conference participants and creates a live transcript of the conversation (201). The topic recognition module 102 then analyzes the live transcript during the video conference using the ontology system 106 (202). In analyzing the live transcript, the topic recognition module 102 identifies one of more topics being discussed during the video conference using the ontology system (203). In this embodiment, any known method of analyzing text using an ontology system may be used. The mapping module 103 maps each identified topics to the expertise of one or more video conference participants using the participant expertise information 107 (204). The display module 104 displays on the screen 109 the video of each participant mapped to one or more identified topics with visual indicators assigned to the one or more identified topics (205). Steps 201-205 each occur in real-time, i.e., while the video conference is occurring. During the video conference, the video conferencing system 100 continuously analyzes the conversation as described above. The method according to embodiments the present invention is scalable and can be used with any number of video conference participants.

Figure 3:
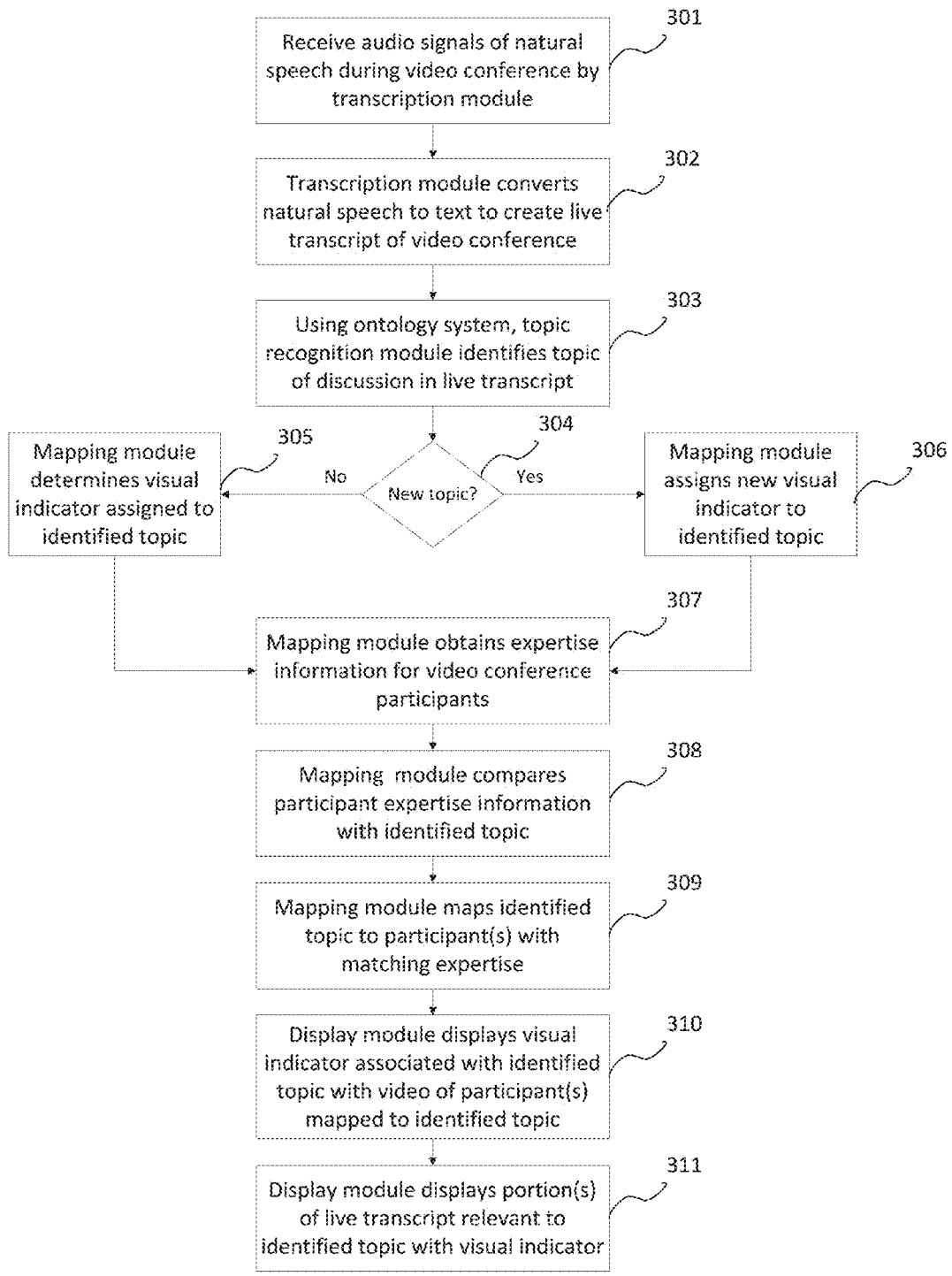
FIG. 3 is a flowchart illustrating in more detail the method for enhancing awareness of video conference participant expertise according to embodiments of the present invention.

FIG. 3 is a flowchart illustrating in more detail the method for enhancing awareness of video conference participant expertise according to embodiments of the present invention. First, the transcription module 101 receives the audio signals 105 of natural speech during the video conference (301). The transcription module 101 converts the natural speech to text to create a live transcript of the video conference (302). In this embodiment, any known method of speech-to-text conversion may be used. The live transcript is then sent to the topic recognition module 102. Using the ontology system 106, the topic recognition module 102 identifies a topic of discussion in the live transcript (303). The identified topic is sent to the mapping module 103. The mapping module 103 determines whether or not the identified topic is a new topic or one that has previously been identified for the video conference (304). When the identified topic is not new (i.e., the topic has previously been identified), the mapping module 103 determines the visual indicator that has been assigned to the identified topic (305). In this embodiment, the mapping module 103 stores a list of topics identified for the video conference and each visual indicators that have been assigned to each topic. The mapping module 103 compares the identified topic against this list. When the identified topic is a new topic, the mapping module 103 assigns a new visual indicator to the identified topic (306), which is then added to the stored list of topics. The mapping module 103 obtains the expertise information for one or more of the video conference participants (307). In one embodiment, for example, the system 100 may interface with social media platforms, gather participant activities on the social media platforms, and analyze the activities to determine a given participant's areas of expertise. The system may send to a given participant questions pertaining to areas of expertise prior to the video conference, and the answers may be stored as part of the given participant's expertise information. In another embodiment, the live transcript of the video conference may be analyzed by the mapping module 103 to determine a given participant's potential expertise based on the participant's contribution to the video conference thus far. The system 100 then sends to the given participant a prompt for confirmation of expertise on a given topic during the video conference, and the given participant's response to the prompt is stored as part of the given participant's expertise information.

The mapping module 103 compares the expertise information for the participant(s) with the identified topic (308), optionally with the help of the ontology system 106. When there is a match between the identified topic and the expertise information for a given participant, the mapping module 103 maps the given participant to the identified topic (309). There may be multiple participants mapped to the same topic, and any given participant may be mapped to multiple topics for the video conference. The participant(s) mapped to the identified topic and the visual indicator assigned to the identified topic are then sent to the display module 104. The display module 104 displays the visual indicator assigned to the identified topic with the video of each participant mapped to the identified topic (310). Optionally, the display module 104 may also display the live transcript received from the transcription module 101, displaying the live transcript on the screen 109 along with the videos of the participants. Further optionally, portions of the live transcript relevant to the identified topic may be shown with the visual indicator assigned to the identified topic (311). The ontology system 106 may be used to assist in identifying the relevant portions of the live transcript.

Figure 4:
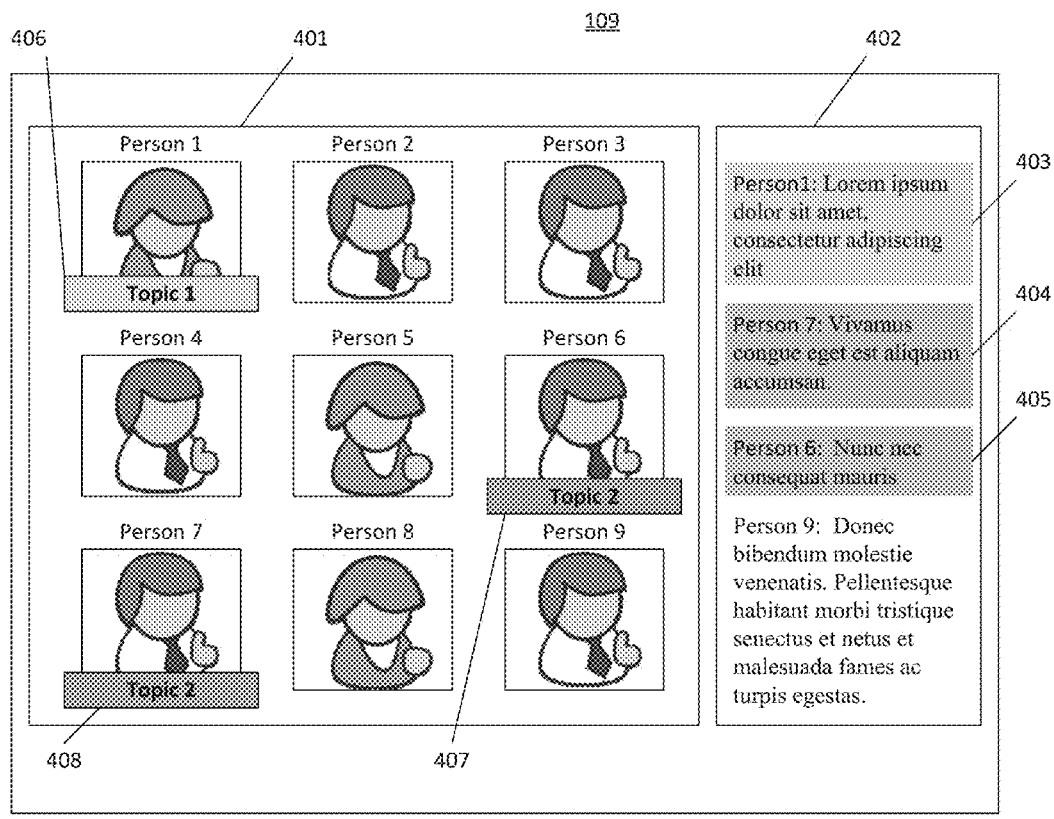
FIG. 4 illustrates an example display of the video conference with visual indicators according to embodiments of the present invention.

FIG. 4 illustrates an example display of the video conference with visual indicators according to embodiments of the present invention. The screen 109 displays videos 401 of the video conference participants, Persons 1-9. The live transcript 402 created by the transcription module 101 is also displayed on the screen 109. Referring to FIGS. 3 and 4, as the video conference occurs, the transcription module 101 receives audio signals of natural speech by the participants (301). The transcription module 101 converts the natural speech to text to create the live transcript 402 of the video conference (302). The live transcript 402 is also sent to the topic recognition module 102. Using the ontology system 106, the topic recognition module 102 identifies Topic 1 from the live transcript 402 (303). Topic 1 is sent to the mapping module 103. The mapping module 103 determines whether or not Topic 1 is a new topic or one that has previously been identified for the video conference (304). Assume here that Topic 1 has been previously identified. The mapping module 103 thus determines the visual indicator that has been assigned to Topic 1 (305). Assume in this example that the visual indicator assigned to Topic 1 is a first shade or color. The mapping module 103 obtains the expertise information for Persons 1-9 (307) and compares the expertise information with Topic 1 (308). Assume here that there is a match between Topic 1 and Person 1, and in response, the mapping module 103 maps Person 1 to Topic 1 (309). The mapping of Person 1 to Topic 1, and the first shade or color assigned to Topic 1, are sent to the display module 104. The display module 104 displays the first shade or color with the video of Person 1 (310). In this example, a label 406 with the first shade or color is displayed with the video of Person 1. Optionally, the portion 403 of the live transcript 402 determined to be relevant to Topic 1 may be shown with the first shade or color (311).

In this example, assume that the topic recognition module 102 also identifies Topic 2 from the live transcript 402 (303). Topic 2 is sent to the mapping module 103. The mapping module 103 determines whether or not Topic 2 is a new topic or one that has previously been identified for the video conference (304). Assume here that Topic 2 is a new topic. The mapping module 103 assigns a new visual indicator to Topic 2 (306). Assume in this example that the new visual indicator assigned to Topic 2 is a second shade or color. The mapping module 103 obtains the expertise information for Person 1-Person 9 (307) and compares the expertise information with Topic 2 (308). Assume here that there is a match between Topic 2 and Persons 6 and 7, and in response, the mapping module 103 maps Persons 6 and 7 to Topic 2 (309). The mapping of Persons 6 and 7 to Topic 2, and the second shade or color assigned to Topic 2, are sent to the display module 104. The display module 104 displays the second shade or color with the videos of Persons 6 and 7 (310). In this example, labels 407-408 with the second shade or color are displayed with the videos of Persons 6 and 7. Optionally, the portions 404-405 of the live transcript 402 determined to be relevant to Topic 2 may be shown with the second shade or color (311).

Optionally, an analysis of participant body language may be performed to gauge levels of engagement during the video conference. In this embodiment, any known method of recognizing and analyzing body language may be used. When a given participant is mapped to an identified topic in the manner described above, the video conferencing system 100 may determine whether the level of engagement by the given participant is below a predetermined threshold. If so, then the system 100 may send a message, a visual prompt, or an audible prompt to the given participant to encourage a greater level of engagement. The given participant's level of engagement may be shared with other participants, such as with the participant currently speaking on the identified topic. Certain visual indicators may be displayed on the screen 109 as well to indicate the level of attentiveness of one or more of the participants.

Optionally, a text chat feature may be offered by the video conferencing system 100 that can be used in parallel with the video conferencing features. The video conferencing system 100 may analyze the text from the chats between participants. The analysis of the text may then be used in combination with the analysis of the live transcript to identify topics being discussed during the video conference and/or in determining the expertise of the participants involved in the chat.

Optionally, participant interests may also be included as the participant expertise information 107. For example, the video conferencing system 100 may be used in an educational context, where participant interests are mapped to identified topics and are shown on the screen 109 in the manner described above. Educators may use the features of the present invention described herein to monitor levels of interest of the student participants and/or to track the level of participation in an identified topic for grading or scoring purposes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
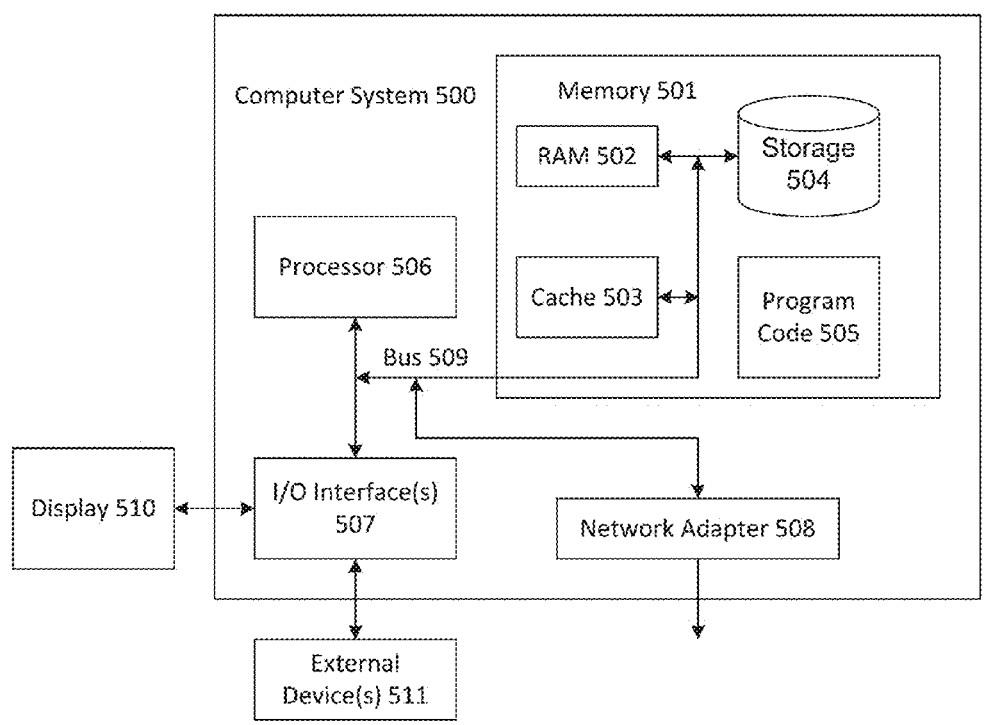
FIG. 5 illustrates a computer system according to embodiments of the present invention.

FIG. 5 illustrates a computer system according to embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for enhancing awareness of video conference participant expertise, comprising:

creating a live transcript of a video conference with a plurality of video conference participants;

analyzing the live transcript during the video conference using an ontology system, wherein the analyzing comprises:

identifying one or more topics being discussed during the video conference using the live transcript and the ontology system, wherein for a given identified topic of the one or more topics, the identifying of the one or more topics being discussed during the video conference using the live transcript and the ontology system further comprises:

determining whether the given identified topic has been previously identified for the video conference;

in response to determining that the given identified topic has been previously identified for the video conference, determining a given visual indicator assigned to the given identified topic; and in response to determining that the given identified topic has not been previously identified for the video conference, assigning a new given visual indicator to the given identified topic; and mapping the one or more topics to expertise of one or more video conference participants using participant expertise information; and displaying a video of each video conference participant mapped to the one or more topics with one or more visual indicators assigned to the one or more topics.

2. The method of claim 1, wherein the mapping of the one or more topics to the expertise of the one or more video conference participants using the participant expertise information comprises:

obtaining the participant expertise information for the plurality of video conference participants;

comparing the participant expertise information with a given identified topic; and mapping the given identified topic to one or more given participants with participant expertise information matching the given identified topic.

3. The method of claim 2, wherein the obtaining of the participant expertise information for the plurality of video conference participants comprises:

interfacing with one or more social media platforms;

gathering activities of the one or more video conference participants on the one or more social media platforms; and determining potential expertise of the one or more video conference participants from the activities.

4. The method of claim 2, wherein the obtaining of the participant expertise information for the plurality of video conference participants comprises:

analyzing the live transcript to identify a potential expertise of a given video conference participant;

sending a prompt to the given video conference participant to confirm the potential expertise; and storing a response to the prompt as part of the participant expertise information for the given video conference participant.

5. The method of claim 1, wherein for a given identified topic of the one or more topics, the method further comprises:

identifying one or more portions of the live transcript relevant to the given identified topic; and displaying the one or more portions of the live transcript with a given visual indicator assigned to the given identified topic.

6. The method of claim 1, wherein the identifying of the one or more topics being discussed during the video conference using the live transcript and the ontology system comprises:

analyzing text from one or more text chats between two or more of the plurality of video conference participants; and identifying the one or more topics being discussed during the video conference using the live transcript, the text from the one or more text chats, and the ontology system.

* * * * *